US012807523B2

(12) United States Patent
Jaffé et al.

(10) Patent No.: US 12,807,523 B2
(45) Date of Patent: Nov. 24, 2026

(54) ENHANCING AMMONIUM OXIDATION AND FLUOROCHEMICAL DEGRADATION WITH FERRIC IRON PHASE COMPRISING POLYMERIC COATINGS

(71) Applicant: THE TRUSTEES OF PRINCETON UNIVERSITY, Princeton, NJ (US)

(72) Inventors: Peter R. Jaffé, Princeton, NJ (US); Bruce E. Koel, Princeton, NJ (US)

(73) Assignee: THE TRUSTEES OF PRINCETON UNIVERSITY, Princeton, NJ (US)

(*) Notice: Subject to any disclaimer, the term of this patent is extended or adjusted under 35 U.S.C. 154(b) by 405 days.

(21) Appl. No.: 18/533,781

(22) Filed: Dec. 8, 2023

(65) Prior Publication Data

US 2024/0190735 A1 Jun. 13, 2024

Related U.S. Application Data

(60) Provisional application No. 63/431,370, filed on Dec. 9, 2022.

(51) Int. Cl.
*C02F 1/72* (2023.01)
*C02F 101/16* (2006.01)

(52) U.S. Cl.
CPC ............ *C02F 1/72* (2013.01); *C02F 2101/16* (2013.01); *C02F 2305/02* (2013.01)

(58) Field of Classification Search
CPC ..... C02F 1/72; C02F 2101/16; C02F 2305/02
See application file for complete search history.

(56) References Cited

PUBLICATIONS

Wan, et al., "Anaerobic ammonium oxidation coupled to Fe(III) reduction: Discovery, mechanism and application prospects in wastewater treatment," Sci. of the Total Environ., 818:151687, 1-12 (Year: 2022).*

* cited by examiner

*Primary Examiner* — Patrick Orme
(74) *Attorney, Agent, or Firm* — J. Clinton Wimbish; Maynard Nexsen PC

(57) ABSTRACT

Media are described herein for the degradation and/or remediation of ammonium, ammonium containing contaminants and/or fluorochemicals. A medium, in some embodiments, comprises an electron donor, an electron acceptor comprising iron particles having a polymeric coating, and a Feammox bacterium and/or one or more enzymes capable of oxidizing the electron donor coupled with reduction of Fe(III) of the iron particles to Fe(II). The electron donor, in some embodiments, comprises ammonium, an ammonium containing compound, and/or molecular hydrogen. The medium, in some embodiments, further comprises a fluorochemical component, and the Feammox bacterium and/or one or more enzymes exhibit reductive dehalogenase activity capable of fluorochemical degradation in conjunction with oxidation of the electron donor and electron transfer to the electron acceptor.

30 Claims, 13 Drawing Sheets

Specification includes a Sequence Listing.

ENHANCING AMMONIUM OXIDATION AND FLUOROCHEMICAL DEGRADATION WITH FERRIC IRON PHASE COMPRISING POLYMERIC COATINGS

RELATED APPLICATION DATA

The present application claims priority pursuant 35 U.S.C. § 119(e) to U.S. Provisional Patent Application Ser. No. 63/431,370 filed Dec. 9, 2022 which is incorporated herein by reference in its entirety.

STATEMENT REGARDING FEDERALLY SPONSORED RESEARCH OF DEVELOPMENT

This invention was made with government support under Grant No. ES032694 awarded by the National Institutes of Health. The government has certain rights in the invention.

SEQUENCE LISTING

The content of the electronic sequence listing (SL-060017-00235.xml; Size 2.13 MB; Date of Creation: Dec. 21, 2023) submitted herewith, is herein incorporated by reference in its entirety.

FIELD

The present invention relates to systems and methods for the degradation of ammonium and fluorochemicals and, in particular, to systems and methods employing microorganisms for ammonium and fluorochemical degradation.

BACKGROUND

The removal of ammonium and other contaminants from soil and water is an important environmental task. Wastewater treatment plants in the developed world and in many developing countries oxidize $NH_4^+$ to $NO_3^-$ before discharging the treated wastewater. This is done to decrease oxygen demand in the receiving waters. Additionally, nitrogen excess in near shore environments has been identified as a major environmental problem leading to eutrophication and anoxia. Legislations are being implemented requiring the conversion of $NO_3^-$ to $N_2$ in conventional waste water treatment plants. The nitrogen compounds that are present in contaminated water, such as ammonium $NH_4^+$, nitrite ($NO_2^-$) and nitrate ($NO_3^-$) will have to be converted to elemental nitrogen $N_2$, which can be released in the gaseous state into an open environment.

Moreover, per- and polyfluoroalkyl substances (PFAS) are emerging contaminants present in many consumer goods. These fluorochemicals are of significant concern due to their potential health effects. Because of their high water solubility, they are ubiquitous in drinking water sources, including groundwater, which becomes the main source of exposure to humans. Efforts in sustainable manufacturing of chemical compounds require that compounds for release into the environment are degradable. PFAS are very stable and little is known about their biodegradability. Even less is known about their mineralization (complete biodegradation to $CO_2$, $F^-$, and water, etc).

Release of polyfluoroalkyl chemicals into the environment can result in the formation of perfluoroalkyl carboxylic (PFCAs) and sulfonic acids (PFSAs), such as perfluorooctanoic acid (PFOA) and perfluorooctane sulfonic acid (PFOS). These compounds are highly persistent and detected widely in the environment. It is unclear if these smaller moieties can be mineralized and, so far, a lack of mineralization data has been reported. Moreover, multiple studies on the degradation of various PFAS concluded that these compounds are stable in the environment.

SUMMARY

In view these problems, media are described herein for the degradation and/or remediation of ammonium, ammonium containing contaminants and/or fluorochemicals. A medium, in some embodiments, comprises an electron donor, an electron acceptor comprising iron particles having a polymeric coating, and a Feammox bacterium and/or one or more enzymes capable of oxidizing the electron donor coupled with reduction of Fe(III) of the iron particles to Fe(II). The electron donor, in some embodiments, comprises ammonium or an ammonium containing compound. Alternatively, the electron donor can comprise molecular hydrogen or a mixture of molecular hydrogen with ammonium or the ammonium containing compound. The medium, in some embodiments, further comprises a fluorochemical component, and the Feammox bacterium and/or the one or more enzymes exhibit reductive dehalogenase activity capable of fluorochemical degradation in conjunction with oxidation of the electron donor and electron transfer to the electron acceptor. Moreover, the Feammox bacterium, in some embodiments, comprises an Acidimicrobiaceae bacterium.

In another aspect, systems for environmental remediation are provided. A system, in some embodiments, comprises a reactor, the reactor including one or more containers comprising a medium including and electron donor, an electron acceptor comprising iron particles having a polymeric coating, and a Feammox bacterium and/or one or more enzymes capable of oxidizing the electron donor coupled with reduction of Fe(III) of the iron particles to Fe(II). As described herein, the electron donor can comprise ammonium, an ammonium containing compound, molecular hydrogen, or various mixtures thereof. The medium can further comprise a fluorochemical component, and the Feammox bacterium and/or one or more enzymes exhibit reductive dehalogenase activity capable of fluorochemical degradation in conjunction with oxidation of the electron donor and electron transfer to the electron acceptor.

In another aspect, methods of environmental remediation are described herein. In some embodiments, a method of environmental remediation comprises providing a medium including an electron donor and a fluorochemical component, and disposing a Feammox bacterium and/or one or more enzymes exhibiting reductive dehalogenase activity in the medium. The fluorochemical component is degraded by the Feammox bacterium and/or enzyme(s) in conjunction with oxidation of the electron donor and electron transfer to an electron acceptor comprising iron particles, wherein electron transfer to the iron particles is enhanced by providing the iron particles a polymeric coating. In another aspect, a method of ammonium oxidation comprises providing a medium including an electron donor comprising ammonium or an ammonium containing compound, an electron acceptor comprising iron particles, and a Feammox bacterium and/or one or more enzymes. The ammonium or ammonium containing compound is oxidized by the Feammox bacterium and/or one or more enzymes coupled with reduction of Fe(III) of the iron particles to Fe(II), wherein electron transfer to the Fe(III) is enhanced by providing the iron particles a polymeric coating. For methods described herein, the polymeric coating of the iron particles, for example, can lower the charge transfer resistance to the iron particles from the Feammox bacterium and/or enzymes.

In some embodiments, of media, systems, and methods described herein, a medium further comprises one or more oxidants operable to oxidize Fe(II), thereby regenerating Fe(III). Any oxidant consistent with the technical objectives described herein can be employed. In some embodiments, for example, the oxidant is elemental sulfur as disclosed in U.S. patent application Ser. No. 16/651,737 which is incorporated herein by reference in its entirety.

These and other embodiments are further illustrated and detailed in the following detailed description.

BRIEF DESCRIPTION OF THE DRAWINGS

The present disclosure can be better understood, by way of example only, with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Figure 1:
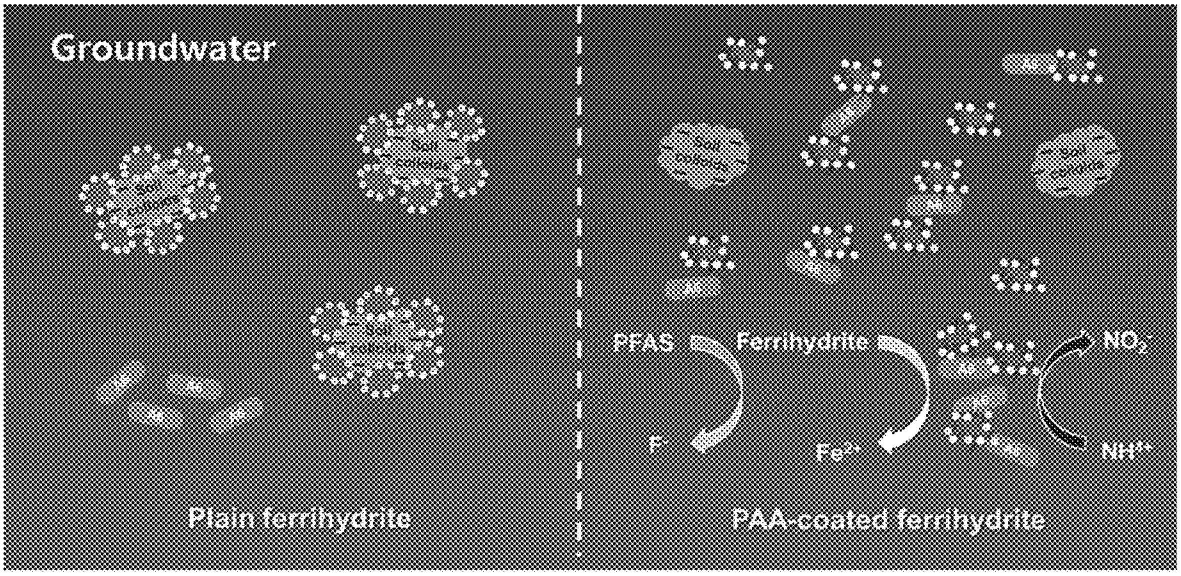
FIG. 1 is a schematic depiction of PAA-coated ferrihydrite as an electron acceptor for *Acidimicrobium* sp. Strain A6 to bioremediate PFAS in sediments or aquifers.

Embodiments described herein can be understood more readily by reference to the following detailed description and examples and their previous and following descriptions. Elements and apparatus described herein, however, are not limited to the specific embodiments presented in the detailed description. It should be recognized that these embodiments are merely illustrative of the principles of the present invention. Numerous modifications and adaptations will be readily apparent to those of skill in the art without departing from the spirit and scope of the invention.

In one aspect, media are described herein for the degradation and/or remediation of ammonium, ammonium containing contaminants and/or fluorochemicals. A medium, in some embodiments, comprises an electron donor, an electron acceptor comprising iron particles having a polymeric coating, and a Feammox bacterium and/or one or more enzymes capable of oxidizing the electron donor coupled with reduction of Fe(III) of the iron particles to Fe(II). The electron donor, in some embodiments, comprises ammonium or an ammonium containing compound. Alternatively, the electron donor can comprise molecular hydrogen or a mixture of molecular hydrogen with ammonium or the ammonium containing compound. The medium, in some embodiments, further comprises a fluorochemical component, and the Feammox bacterium and/or the one or more enzymes exhibit reductive dehalogenase activity capable of fluorochemical degradation in conjunction with oxidation of the electron donor and electron transfer to the electron acceptor. As described herein, when degrading fluorochemicals, electron transfer is to Fe(III) of the polymeric coated iron particles, resulting in Fe(II) production.

Turning now to specific components, the electron donor can comprise ammonium or an ammonium containing compound. An ammonium containing compound may be a contaminant from an industrial, agricultural or human municipal waste source. Ammonium containing contaminants, for example, can comprise fertilizers, domestic sewage, or industrial effluents. The ammonium containing contaminant may comprise ammonium chloride and/or any other ammonium salt. The ammonium containing contaminant may also be a nitrogen containing organic compound, wherein nitrogen may be hydrolyzed to ammonium. Alternatively, the electron donor can comprise molecular hydrogen or a mixture of molecular hydrogen with ammonium or the ammonium containing compound.

The fluorochemical component of the medium, when present, can comprise one or more fluorinated organic compounds. In some embodiments, the fluorochemical component comprises one or more fluorochemicals selected from the group consisting of perfluoroalkyl compounds, polyfluoroalkyl compounds, fluorinated carboxylic acids, fluorinated alcohols, and fluorinated sulfonates. In some embodiments, the fluorochemical component comprises one or more compounds selected from the following Table:

TABLE

| Fluorochemicals |
|---|
| Heptafluorobutyric acid (HFBA) |
| Perfluorooctanoic acid (PFOA) |
| 2,2,2-Trifluoroethyl Nonafluorobutanesulfonate (PFBS) |
| 6:2 Fluorotelomer sulfonate (6:2 FTS) |
| 8:2 Fluorotelomer Alcohol (8:2 FTOH) |
| Ammonium 4,8-dioxa-3H-perfluorononanoate (ADONA) |
| Perfluorobutanoic acid (PFBA) |
| Perfluorooctane sulfonamide (FOSA) |
| Perfluorooctane sulfonate (PFOS) |
| Perfluoroheptane sulfonate (PFHpS) |
| Perfluorohexane sulfonate (PFHxS) |
| Perfluoropentanoic acid (PFHeA) |
| Perfluoroheptanoic acid (PFHpA) |
| Perfluorohexanoic acid (PFHxA) |
| Perfluoropentane sulfonate (PFPeS) |
| Pentafluoropropionic acid (PFPrA) |
| 6:2 Fluorotelomer alcohol (6:2 FTOH) |
| 8:2 Fluorotelomer phosphate diester (8:2 diPAP) |
| 8:2 Fluorotelomer sulfonate (8:2 FTS) |

As described herein, the medium also includes an electron acceptor comprising iron particles having a polymeric coating, the iron particles including at least some iron in the +3 oxidation state, Fe(III). In some embodiments, the electron acceptor particles comprise iron oxide, a goethite, elemental iron, a nontronite, iron-rich clay or various mixtures thereof. Iron oxide can include hydrated forms, such as ferrihydrite. Ferrihydrite includes a dark brown or yellow brown mineral composed of about 20% ($FeO_4$) and 80% ($FeO_6$) polyhedral. The term "goethite" refers to an iron oxyhydroxide containing ferric iron. The term "nontronite" refers to the Fe(III) rich clay mineral having a typical structural formula $Ca_{0.5}(Si_7Al_{0.8}Fe_{0.2})(Fe_{3.5}Al_{0.4}Mg_{0.1})O_{20}(OH)_4$. The Fe(III) source may be scrap metal, or any other source of ferric iron.

The electron acceptor iron particles have a polymeric coating associated with one or more surfaces of the particles. In some embodiments, the iron particles are encapsulated by the polymeric coating. In other embodiments, the iron particles are partially coated by the polymeric coating. Any polymeric coating consistent with the technical objectives described herein can be employed. In some embodiments, polymer of the polymeric coating comprises one or more negatively charged moieties. Negatively charged moieties can reside on or in the polymer backbone or can be pendant to the polymer backbone. Negatively charged moieties, in some embodiments, can include carboxylate, sulfonate, and/or phosphonate. In some embodiments, such moieties are negative at certain pH values of the medium. The negatively charged moieties, for example, can exhibit a pKa of 4-7. Below the pKa, the moieties are protonated and, therefore, do not exhibit negative charge. Polymeric species of the coating can include, polyacrylates, such as polyacrylic acid (PAA), polymethacrylic acid (PMAA), or copolymers thereof. Polymeric species of the coating can also comprise polysulfonic acids, such as vinylsulfonic acid, polystyrene sulfonic acid (PSSA), or poly(2-acrylamido-2-methyl-1-propanesulfonic acid (PAMPSA). Polymeric species of the coating can also include polyphosphonic acid, such as poly(vinylphosphonic acid). The polymer of the coating can have any desired molecular weight. In some embodiments, polymer of the coating has a weight average molecular weight of 2,000 to 500,000 Da.

The polymeric coating can be present at any desired ratio to the iron particles. In some embodiments, the ratio of polymer coating mass to iron particle mass ranges from 1:100 to 1:5. The following table provides additional ratios of polymer coating mass to iron particle mass, according to some embodiments.

TABLE

| Ratio of Polymer Mass to Iron Particle Mass |
|---|
| 1:50 |
| 1:30 |
| 1:20 |
| 1:15 |
| 1:10 |
| 1:5 |

The polymer coated iron particles of the medium, in some embodiments, exhibit negative zeta potential. As described further herein, the absolute value of the negative zeta potential can increase as the ratio of polymer mass to iron particle mass increases. In some embodiments, the coated iron particles exhibit a zeta potential of −5 to −30 or −10 to −25. Moreover, in some embodiments, the polymer coating exhibits porosity and associated pore structures.

The medium also comprises a Feammox bacterium and/or enzyme(s) thereof capable of fluorochemical degradation in conjunction with oxidation of the electron donor (e.g. ammonium, hydrogen) and electron transfer to the electron acceptor. The Feammox bacterium may be an Actinobacterium or a bacterium with a similar genetic composition. In some embodiments, for example, the Feammox bacterium is an Acidimicrobiaceae bacterium or variant thereof. The Feammox bacterium may be a bacterial strain that was isolated from wetland soils collected in New Jersey after a series of enrichment incubations. The soil samples were collected at the location identified as 40° 15' N-74° 30' W or within 100 m of the identified location. The Feammox bacterium may be the bacterial strain designated the Acidimicrobiaceae Feammox bacterium A6 or variant thereof. In being a variant in some embodiments, the bacterium may have at least 70% genome overlap with an Actinobacterium. The Acidimicrobiaceae Feammox bacterium A6 was submitted for deposit with the American Type Culture Collection (ATCC; 10801 University Blvd. Manassas, Virginia 20110-2209, USA) on Apr. 27, 2015, the submission was supplemented on May 7, 2015, and was assigned Accession Deposit Number PTA-122488 on Sep. 17, 2015. The Acidimicrobiaceae Feammox bacterium may have a genome comprising, consisting essentially of, or consisting of a nucleic acid sequence with at least 70, 72, 75, 80, 85, 90, 91, 92, 93, 94, 95, 96, 97, 98, 99, or 100% identity to SEQ ID NO: 1. The Feammox bacterium may have the genome size of 3.3 mega base pairs (Mb) and guanine-cytosine content 52%. The bacterial genome may further include a gene encoding a Feammox Ammonium Monooxygenase. As used herein, the term "Feammox Ammonium Monooxygenase" (FMO) refers to an enzyme that plays a key role in oxidizing ammonium coupled with ferric iron reduction. The FMO also refers to genes encoding clones or different variants of the Feammox Ammonium Monooxygenase. The gene may include a nucleic acid comprising, consisting essentially of, or consisting of a nucleic acid sequence with at least 70, 72, 75, 80, 85, 90, 91, 92, 93, 94, 95, 96, 97, 98, 99, or 100% identity to a sequence selected from the group consisting of: SEQ ID NOS: 8-28. The Feammox Ammonium Monooxygenase may include an amino acid comprising, consisting essentially of, or consisting of a nucleic acid sequence with at least 70, 72, 75, 80, 85, 90, 91, 92, 93, 94, 95, 96, 97, 98, 99, or 100% identity to a sequence selected from the group consisting of: SEQ ID NOS: 29-49. The Feammox bacterium may be live or lyophilized.

SEQ ID NOS of FMO Related Enzymes and Genes

| FMO clone* | SEQ ID NO (Gene) | SEQ ID NO (Enzyme) |
|---|---|---|
| ERCFMO_0001 | 8 | 29 |
| ERCFMO_0002 | 9 | 30 |
| ERCFMO_0003 | 10 | 31 |
| ERCFMO_0004 | 11 | 32 |
| ERCFMO_0005 | 12 | 33 |
| ERCFMO_0006 | 13 | 34 |
| ERCFMO_0007 | 14 | 35 |
| ERCFMO_0008 | 15 | 36 |
| ERCFMO_0009 | 16 | 37 |
| ERCFMO_0010 | 17 | 38 |
| ERCFMO_0011 | 18 | 39 |
| ERCFMO_0012 | 19 | 40 |
| ERCFMO_0013 | 20 | 41 |
| ERCFMO_0014 | 21 | 42 |
| ERCFMO_0015 | 22 | 43 |
| ERCFMO_0016 | 23 | 44 |
| ERCFMO_0017 | 24 | 45 |
| ERCFMO_0018 | 25 | 46 |
| ERCFMO_0019 | 26 | 47 |
| ERCFMO_0020 | 27 | 48 |
| ERCFMO_0021 | 28 | 49 |

In some embodiments, Feammox bacteria and related enzymes are described in U.S. Pat. No. 9,815,723 which is incorporated herein by reference in its entirety.

Determining percent identity of two nucleic acid sequences may include aligning and comparing the nucleotides at corresponding positions in the two sequences. If all positions in two sequences are occupied by identical nucleotides then the sequences are said to be 100% identical.

Percent identity may be measured by the Smith Waterman algorithm (Smith T F, Waterman M S 1981 "Identification of Common Molecular Subsequences," *J Mol Biol* 147: 195-197, which is incorporated herein by reference as if fully set forth).

Additionally, Feammox bacteria and/or related enzymes described herein may undergo alterations or modifications during the fluorochemical degradation process. Alterations or modifications to the Feammox bacteria and/or related enzymes can be dependent on reactions conditions, in some embodiments. For example, in the presence of molecular hydrogen as the electron donor, the Feammox bacteria can lose its plasmid and the concomitant ability to oxidize ammonium. As the plasmid is distinct from chromosomal DNA, the loss of the plasmid does not render the Feammox bacteria a different organism falling outside the claims and scope of the present disclosure. Notably, methods and systems described herein contemplate alterations and/or modifications to Feammox bacteria and/or related enzymes resulting from the reaction conditions and/or the degradation of fluorochemicals.

As described herein, the medium may comprise one or more enzymes, such as FMO, in addition to the Feammox bacterium for the degradation of fluorochemical(s) in conjunction with oxidation of the electron donor and electron transfer to the electron acceptor. Alternatively, one or more enzymes, such as FMO, can be present in the medium in the absence of the Feammox bacterium. In such embodiments, the one or more enzymes can be responsible for fluorochemical degradation. In some embodiments, for example, FMO is isolated from Feammox bacterium and employed in the media. In other embodiments, the one or more enzymes may be fabricated via synthetic chemical techniques.

In some embodiments, the medium comprises one or more enzymes exhibiting reductive dehalogenase activity for fluorochemical degradation including, but not limited to, one or more reductive dehalogenases and/or reductive dehalogenase variants. Dehalogenase content of the medium can be expressed by one or more bacterium in the medium including, but not limited to, Feammox bacteria. In some embodiments, one or more dehalogenases and/or enzymes exhibiting dehalogenase activity are present in the medium in the absence of bacteria or other expressing species. Suitable enzymes are described in U.S. patent application Ser. No. 17/279,918 which is incorporated herein by reference in its entirety.

In some embodiments, the medium further comprises one or more electron shuttling compounds. Any electron shuttling compound consistent with the objectives of fluorochemical degradation can be used. In some embodiments, an electron shuttling compound is 9,10-Anthraquinone-2,7-disulphonic acid (AQDS).

The medium can comprise water, soil, sludge, sorbents and/or any solids contaminated with fluorochemicals and/or ammonium containing compounds. The water can be any source of water, including ground water, lakes, streams and/or reservoirs. In some embodiments, the water is wastewater. As used herein, the term "wastewater" refers to any water that has been adversely affected in quality by anthropogenic influence. Wastewater may be municipal wastewater, industrial wastewater, agricultural wastewater, surface runoff, stormwater, or wastewater combining wastewater from multiple sources. Wastewater may be treated in a wastewater treatment plant. Similarly, soil may be any soil that has been adversely affected in quality by anthropogenic influence. The soil may include groundwater. The groundwater may comprise wastewater described herein. In some embodiments, the medium has a pH of 4 to 7.

In some embodiments, the medium may further comprise a carrier. The carrier may support growth of the Feammox bacterium. The carrier may comprise a filter, beads, agarized medium, or any surface that allows bacterial attachment. The carrier may include media for culturing the Feammox bacterium. The media may be inorganic $NH_4^+$-ferric iron media. The inorganic $NH_4^+$-ferric iron media may be solid media or liquid media. The liquid media may include but not limited to the following components: $NH_4Cl$, $(NH_4)_2SO_4$, $NaHCO_3$, $KHCO_3$, $KH_2PO_4$, 100 mg $MgSO_4 \cdot 7H_2O$, and $CaCl_2 \cdot 2H_2O$. The liquid media may further include ferrihydrite, AQDS, trace element solution or vitamins. Vitamins may be but are not limited to ATCC® vitamins. The liquid media may have a pH in a range from 2.0 to 8.0 or 4.0 to 7.0. The media may include traces of dissolved oxygen. The solid medium may have the same composition as the liquid media but include elements to solidify the mixture. The solid media may be solidified with 0.8% agar. The solid media may include ferrihydrite that is spread on the surface of the medium.

II. Systems for Environmental Remediation

In another aspect, systems for environmental remediation are provided. A system, in some embodiments, comprises a reactor the reactor including one or more containers comprising a medium including and electron donor, an electron acceptor comprising iron particles having a polymeric coating, and a Feammox bacterium and/or one or more enzymes capable of oxidizing the electron donor coupled with reduction of Fe(III) of the iron particles to Fe(II). As described herein, the electron donor can comprise ammonium, an ammonium containing compound, molecular hydrogen, or various mixtures thereof. The medium can further comprise a fluorochemical component, and the Feammox bacterium and/or one or more enzymes exhibit reductive dehalogenase activity capable of fluorochemical degradation in conjunction with oxidation of the electron donor and electron transfer to the electron acceptor. In such embodiments, Fe(III) of the electron acceptor polymer coated iron particle is reduced to Fe(II)

In some embodiments, the reactor comprises an inlet and outlet for the medium, such as a water and/or soil. The reactor, for example, can be operated continuously or in a batch, mode. Components of the medium, including the ammonium component or electron donor, fluorochemical component, electron acceptor and Feammox bacterium and/or enzyme(s) thereof can have any properties and/or compositions described in Section I hereinabove. Moreover, the medium can comprise water, soil, sludge, sorbents, and/or any solid contaminated with one or more fluorochemicals. Water of the system can be any source of water, including wastewater, ground water, lakes, streams and/or reservoirs.

The reactor may be a continuous reactor or a batch reactor. In an embodiment, a reactor may be an industrial-type reactor. The reactor may operate within a water treatment plant. The reactor may be a treatment pond or a reservoir. The reactor may be a tank for wastewater storage.

Reactor conditions may generally include a temperature in a range from 4° C. to 35° C. The temperature may be in a range between any two integer value temperatures selected from 4° C. to 35° C. The temperature may be in a range between and including 4° C. to 10° C., 10° C. to 15° C., 15° C. to 20° C., 20° C. and 25° C., 25° C. and 30° C., 30° C. and 35° C. The temperature may be any one integer value temperature selected from those including and between 4° C. and 35° C. or 15° C. to 35° C. Temperatures between room temperature and 35° C. may be used. The temperature may be any one temperature including and between room temperature and 35° C. Temperatures between 20° C. and 35° C. may be used. The temperature may be any temperature including and between 20° C. and 25° C.

The reactor may be operated for any desired time period. In some embodiments, the reactor is operated for a time period ranging from 2 hours to 45 days. The time period may be 5 hours, 10 hours, 15 hours, 20 hours, 1 day, 2 days, 3 days, 4 days, 5 days, 10 days, 15 days, 20 days, 25 days, 30 days, 35 days, 40 days or 45 days. The time period may be any one integer value selected from those including and between value points, endpoints inclusive. The time period may be greater than 45 days. The time period may be less than 1 day. In continuous flow reactors or in batches, the process may last from several hours to several months. For continuous flow reactors, the time period may depend on the bacterial concentration in the inoculum. Higher bacterial concentration in the inoculum may result in a shorter remediation time. The time period may depend on hydraulic retention capacity of a continuous flow reactor. Lower retention capacity of the continuous flow reactor may result in a shorter remediation time. Hydraulic residence time for the continuous flow reactors may be from 3 hours to 4 hours, from 3 hours to 5 hours, from 3 hours to 6 hours, from 3 hours to 7 hours, from 3 hours to 8 hours, from 3 hours to 10 hours, from 3 hours to 15 hours, from 3 hours to 20 hours, from 3 hours to 1 day, from 3 hours to 2 days, from 3 hours to 3 days or longer. Hydraulic residence time may be any integer value selected from those including and between value points, endpoints inclusive pH of the medium in the reaction can range from 2.0 to 8.0 or 4.0 to 7.0.

III. Methods of Environmental Remediation

In another aspect, methods of environmental remediation are described herein. In some embodiments, a method of environmental remediation comprises providing a medium including an electron donor and a fluorochemical component, and disposing a Feammox bacterium and/or one or more enzymes exhibiting reductive dehalogenase activity in the medium. The fluorochemical component is degraded by the Feammox bacterium and/or enzyme(s) in conjunction with oxidation of the electron donor and electron transfer to an electron acceptor comprising iron particles, wherein electron transfer to the iron particles is enhanced by providing the iron particles a polymeric coating. In another aspect, a method of ammonium oxidation comprises providing a medium including an electron donor comprising ammonium or an ammonium containing compound, an electron acceptor comprising iron particles, and a Feammox bacterium and/or one or more enzymes. The ammonium or ammonium containing compound is oxidized by the Feammox bacterium and/or one or more enzymes coupled with reduction of Fe(III) of the iron particles to Fe(II), wherein electron transfer to the Fe(III) is enhanced by providing the iron particles a polymeric coating. Media in methods described herein can have any composition and/or properties described in Section I above.

These and other embodiments are further illustrated by the following non-limiting examples.

Example 1—Materials and Methods

Poly-Acrylic Acid (PAA) Coating with Ferrihydrite

PAAs with four different molecular weights (i.e., 2.1K, 6K, 240K, and 450K) were employed to modify the surface of a 2-line ferrihydrite. Sodium PAA with a molecular weight of 6,000 (PAA 6K) was supplied by Polysciences as a white powder. Sodium PAA with molecular weights of 2,100 (powder, PAA 2.1K), 240,000 (PAA 240K, 25 wt. % in $H_2O$), and 450,000 (powder, PAA 450K, ~0.2% cross-linked) were purchased from Sigma Aldrich. All PAA stock solutions were prepared with deionized water unless otherwise specified.

A suspension of 2-line ferrihydrite at a concentration of 10 g/L was treated (coated) with PAA by adding a PAA solution until the final solid content reached 2.15 g/L. The coating process was conducted using an $NH_4^+$ enrichment salt medium, referred to as the A6 growth medium, which is composed of 3.82 mM $NH_4Cl$, 0.59 mM $(NH_4)_2SO_4$, 0.24 mM $NaHCO_3$, 0.71 mM $KHCO_3$, 0.07 mM $KH_2PO_4$, 0.41 mM $MgSO_4 \cdot H_2O$, and 0.40 mM $CaCl_2 \cdot 2H_2O$. PAA with four different molecular weights were utilized to coat ferrihydrite in the A6 growth medium at pH 5.5. In addition, a sample of 6K-coated ferrihydrite was prepared using the same procedure but at a pH of 7.5.

Unless otherwise specified, the suspension was agitated for 24 hrs. at 20° C. Following agitation, the suspension underwent centrifugation (13,010 g, 30 min). A 15 mL sample of the PAA-coated ferrihydrite was then collected to measure the total organic carbon (TOC) content. The TOC analysis was conducted using a Shimadzu V-TOC/TN analyzer in the non-purgeable organic carbon (NPOC) mode. The concentration of PAA in the supernatant was determined using NPOC analysis. The low-loading NPOC analysis consisted of adding 2% 2 N HCl acid, sparging for 1.5 minutes, and making 2-3 injections with a 50 mL injection volume. Default values were used for all other settings.

Furthermore, PAA-coated ferrihydrite samples were prepared as described above with a concentration of 1/5 wt %. These samples were then exposed to 100 mg/L of Toluidine Blue O (TBO) ($C_{15}H_{16}N_3SCl$, Spectrum Chemical Manufacturing Corporation). TBO is a cationic dye that binds to the carboxylic group of the PAA through electrostatic interactions, specifically to negatively charged PAA. The residual TBO concentration in the supernatant of both bare ferrihydrite and PAA-coated ferrihydrite samples was measured using UV-vis spectrometry.

Particle Stability of Bare Ferrihydrite and PAA-Coated Ferrihydrite in the A6 Growth Medium Dynamic light scattering (DLS) and electrophoretic light scattering (ELS) were measured using a Malvern Zetasizer Nano instrument to determine the hydrodynamic particle size and zeta potential of particles. The zeta potentials of bare ferrihydrite and PAA-coated ferrihydrite (1/10 wt %) were measured at various pH values. Different ratios of total PAA to ferrihydrite (ranging from 1/100 to 1/2 wt %) were tested at pH 5.5 to assess the change in zeta potentials. Both bare ferrihydrite and PAA-coated ferrihydrite were prepared in the A6 growth medium 12 hrs before analysis. The solid content of the 2-line ferrihydrite was kept constant at 50 mg/L for all particle stability tests. Before conducting the DLS and ELS measurements, the final samples were sonicated in a water bath for 5 min and stirred.

The effect of $NH_4^+$ and $Ca^{2+}$ on the particle stability of PAA-coated ferrihydrite was studied as a function of the concentrations of these cations in the A6 growth medium. Either a 12 mM $NH_4C$ or $CaCl_2$) stock solution was used to adjust the concentrations in the A6 growth medium. The zeta potential changes were examined for an $NH_4^+$ concentration ranging from 0 to 4 mM using 6K and 450K-coated ferrihydrite, and a $Ca^{2+}$ concentration ranging from 0 to 2 mM using the 450K-coated ferrihydrite.

Environmental Scanning Electron Microscopy (ESEM) Measurements

An ESEM (Quanta 200 FEG, FEI Company Hillsboro, OR) was employed to observe the ferrihydrite surface in the absence and presence of PAA. Four different molecular weights of PAA were used to coat 2.5 g/L of ferrihydrite (1/10 wt %) in the A6 growth medium. A small volume of suspension was placed on an aluminum grid and then measured at the ESEM mode (1 Torr). Measurements were conducted at an accelerating voltage of 10 kV (PAA-coated samples) and 30 kV (bare ferrihydrite) and a working distance range of 9.9 mm to 11 mm.

Feammox Incubations in the Presence of PFOA at 1 mg/L

For the Feammox incubations with PFOA, an aliquot of PFOA was added to the growth medium to reach a final PFOA concentration of 1 mg/L (0.0024 mM). All incubations were carried out at pH 5.5, as A6 requires acidic conditions for its growth (Huang and Jaffé, 2016). The relatively high PFOA concentration was chosen to ensure accurate detection of PFOA degradation byproducts such as $F^-$ and shorter-chain PFAS. It has previously been demonstrated that such concentrations do not exhibit toxic effects on the A6 activity in terms of overall growth, $NH_4^+$ oxidation, or Fe(III) reduction.

A 7 mM suspension of 2-line ferrihydrite was added to the PAA-free sample (control) and the PAA-coated ferrihydrite samples as the electron acceptor for the Feammox process. This concentration of ferrihydrite was selected based on the results of previous Feammox incubations to defluorinate PFAS. The resulting mixtures were then distributed into serum vials and sealed with butyl rubber stoppers. The headspace of each vial (2 mL) was evacuated, followed by filling it with a gas mixture of $N_2/CO_2$ (80:20). This step was carried out to maintain the required anoxic condition for A6 growth and to provide $CO_2$ as the carbon source for A6, which is an autotrophic organism. Samples were incubated on a rotary shaker (150 rpm) at 20° C. for 50 days. Triplicate samples were collected at specified sampling dates and filtered (0.22 μm) to measure the concentrations of $NH_4^+$, PFOA, degradation intermediates ($C_nF_{2n+1}COO^-$, n=4-7), and $F^-$. The pH in the incubation vials increased to 6.5 by the end of the incubation period. Additional samples were stored at 4° C. for microbial analysis.

Chemical analyses of Feammox Incubation Samples

Ion chromatography (IC) was performed with a conductivity detector to measure $NH_4^+$ and $F^-$ ions (ICS-3000, Dionex Co., USA). Cations and anions were analyzed using a CS16 column (4 mm i.d.×200 mm) and an AS18 column (4 mm i.d.×200 mm), respectively.

Fe(II) was analyzed using the ferrozine assay method, which has been previously described for Feammox incubations. The pH was measured using a Hach HQ40d multiprobe meter (Hach, Loveland, CO, USA). PFOA and shorter-chain perfluoroalkyl acids (PFAAs) such as perfluoroheptanoic acid (PFHpA), perfluorohexanoic acid (PFHxA), perfluoropentanoic acid (PFPeA), and perfluorobutanoic acid (PFBA) were quantified using ultraperformance liquid chromatography-tandem mass spectrometry (UPLC-MS-MS: Agilent 1290-6430A). The analysis was performed by SGS-CSTC Standards Technical Services Co., Ltd (China) following established methods. A volume of 10 μL of a mixture of surrogate internal standards, prepared at a concentration of 50 ng/mL in pure methanol, was added to all samples. The PFAS native standards (i.e., shorter-chain PFAAs) and isotopically labeled internal standards such as $_{13}C_4$-PFBA, $_{13}C_5$-PFPeA, $_{13}C_5$-PFHxA, $_{13}C_4$-PFHpA, and $_{13}C_8$-PFOA were provided by Wellington Laboratories (Guelph, Canada). A standard curve within the range of 0.5-100 ug/L was generated after appropriate dilution with methanol to quantify the compounds. A blank control was included in each sample sequence to confirm the absence of the target compounds. The Agilent ZORBAX SB-C18 column (150×2.1 mm, 3.5 μm) with a mobile gradient phase of (A) 85% ammonium acetate solution and (B) 100% acetonitrile was operated at 30° C. with a flow rate of 0.3 mL/min. The eluent gradient started at 30% (B) for 2 min, then increased to 90% (B) in 3 mins. The eluent was then returned to the initial condition within 0.1 min and maintained for 4.9 min during the injection interval for equilibration. Negative electrospray ionization (ESI) mass spectrometry in a multiple reaction monitoring mode (MRM) was used for the detection of PFAS.

Electrochemical Impedance Spectroscopy (EIS) Measurements

Electrochemical impedance spectroscopy (EIS) measurements of the electrode were conducted as per a modified prior method. EIS measurements were performed at the open circuit potential ($E_{ocp}$) with a frequency range from 1 MHz to 0.1 Hz and a working amplitude of 25 mV on a CHI760E Electrochemical Workstation. The impedance data was fitted to an equivalent circuit model using the CHI760E workstation. The electrochemical cell used a single-compartment housing with a Pt mesh counter electrode, an Ag/AgCl reference electrode (saturated KCl), and a glassy carbon electrode (Basi, 3.0 mm diameter) coated with a material of interest as the working electrode. A supporting electrolyte of 0.1 M $NH_4Cl$ (adjusted to pH 5.5 with 0.1 M $NH_4OH$) was used. Bare ferrihydrite, 6K-coated ferrihydrite, and 450K-coated ferrihydrite were prepared in DI water as described earlier. After centrifugation (14,000 g, 30 min), the residual solid was washed with DI water to remove dissolved PAA in the solution. The working electrode was fabricated by suspending 5 mg of bare ferrihydrite, 6K-coated ferrihydrite, or 450K-coated ferrihydrite in 1 mL of methanol and drop-casting 14 μL of the suspension onto the surface of the glassy carbon electrode to achieve a ferrihydrite loading of 1 mg/cm$^2$.

Microbial Analysis of Incubation Samples Total genomic DNA was extracted from incubation samples using the Fast DNA™ SPIN Kit for Soil DNA Extraction (MP Biomedicals) following the manufacturer's instructions.

Subsequently, the DNA samples were stored at −20° C. until further analyses. Quantitative polymerase chain reaction (qPCR) was performed using an Applied Biosystems StepOnePlus™ Real-Time PCR system to quantify A6. The DNA primer set was utilized for the A6 quantification. The A6 quantification was done in triplicate for each sample, and negative controls were included. Serial dilutions of known A6 DNA copy numbers were measured to determine the standard curve.

The V4-V5 region of 16S rRNA genes was sequenced from samples collected on day 0 and day 40 of the incubations to compare the effects of different PAAs on a microbial structure. The region was amplified using the primer set 515 F-806 R, and the PCR reactions were carried out with a Veriti 96 well Thermal cycler (Applied Biosystems). A TruSeq® DNA PCR-Free Sample Preparation Kit (Illumina, USA) was used to prepare sequencing libraries, and the quality of the library was verified using a Qubit@2.0 Fluorometer (Thermo Scientific) before sequencing on an Illumina MiSeq platform. Paired end reads of 250 bp were generated. The operational taxonomic units (OTUs) were clustered using Uparse software (Uparse v7.0.100, drive5.com/uparse/) with a 97% similarity cut-off. Taxonomic analysis of the sequences was conducted using Mother (version v.1.30.1) against the Silva SSUrRNA database with a confidence threshold of 0.8-1.

Example 2—Results

Characteristics of PAA Coated-Ferrihydrite in the A6 Growth Medium

Figure 2:
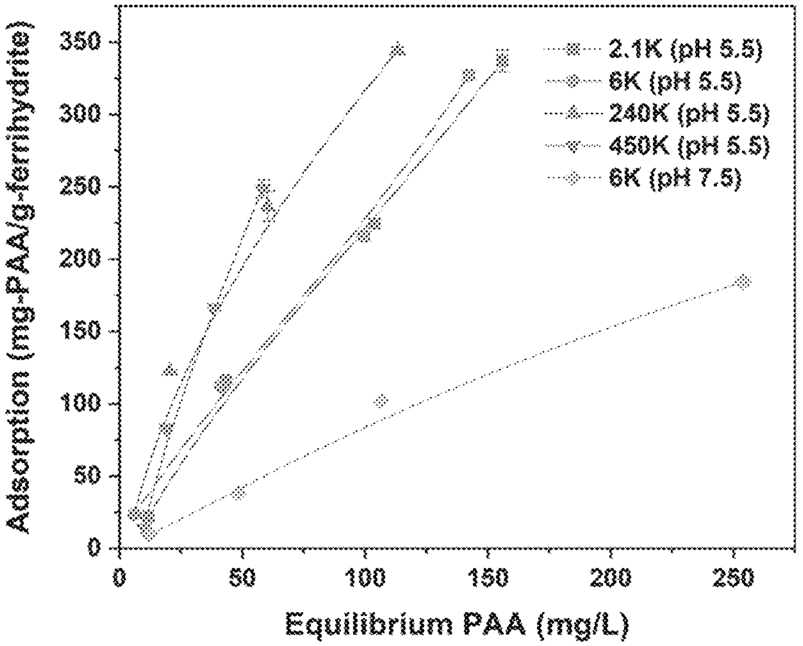
FIG. 2 is a graphical representation of adsorption isotherms of four different molecular weight PAAs on ferrihydrite and effect of pH. Squares represent 2.1K PAA at a pH of 5.5, circles represent 6K PAA at a pH of 5.5, upward triangles represent 240K PAA at a pH of 5.5, downward triangles represent 450K PAA at a pH of 5.5, and diamonds represent 6K PAA at a pH of 7.5.

FIG. 2 displays the sorption isotherms of PAA on ferrihydrite in the A6 growth medium. As the A6 growth medium is typically introduced to sediments or aquifers under acidic conditions for biostimulation or bioaugmentation of A6, sorption isotherms of PAA on ferrihydrite were performed for four molecular weights of PAAs at a pH 5.5. To examine the impact of pH, additional isotherms were measured for the 6K PAA at pH 7.5. The results presented in FIG. 2 show that the higher molecular weight PAAs (240K and 450K) sorb much stronger onto the ferrihydrite than the lower molecular weight PAAs (2.1K and 6K), and that as pH increases, as shown for the 6K PAA, sorption decreases.

Figure 3:
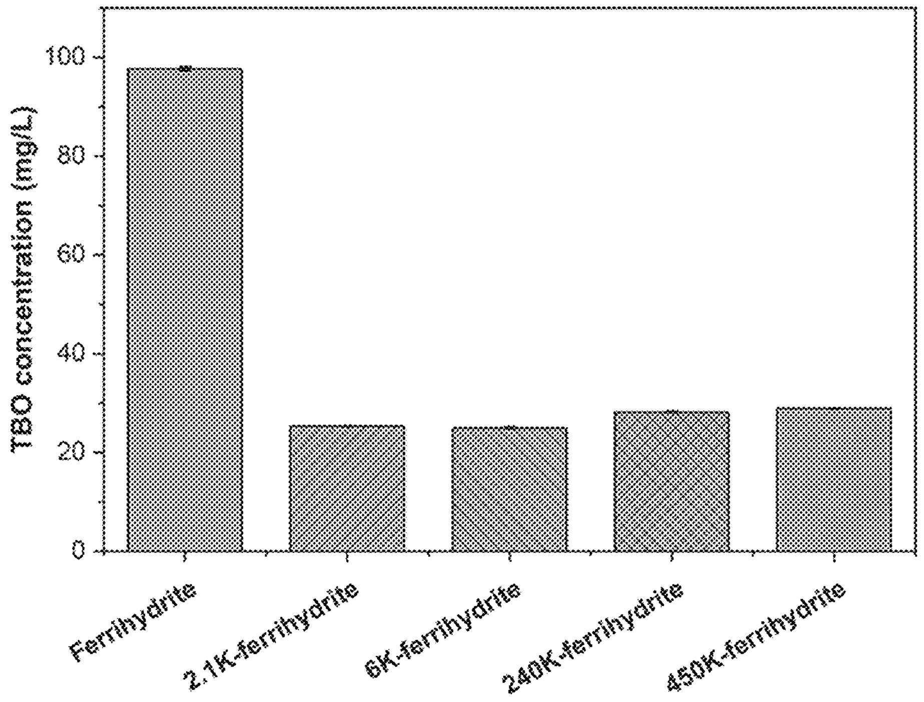
FIG. 3 is a graphical analysis of Toluidine Blue O (TBO) concentrations in the solution containing ferrihydrite and PAA-coated ferrihydrite (⅕ wt %) at pH 5.5.

FIG. 3 depicts the TBO concentrations, illustrating the sorption characteristics of bare ferrihydrite and PAA-coated ferrihydrite. Without the presence of PAA, there was a negligible sorption of TBO onto ferrihydrite. However, when PAA was introduced, a significant reduction in TBO concentration was observed, resulting in values of 25.3, 25.0, 28.2, and 28.9 mg/L for 2.1K, 6K, 240K, and 450K-coated ferrihydrite, respectively. The higher TBO concentrations observed with larger molecular weight PAAs, particularly 240K and 450K, may be attributed to a stronger binding of the negatively charged PAA onto ferrihydrite, which leads to a lower concentration of residual PAAs in the supernatant. These findings align with the sorption results discussed above and the zeta potential measurements discussed below.

Figure 4:
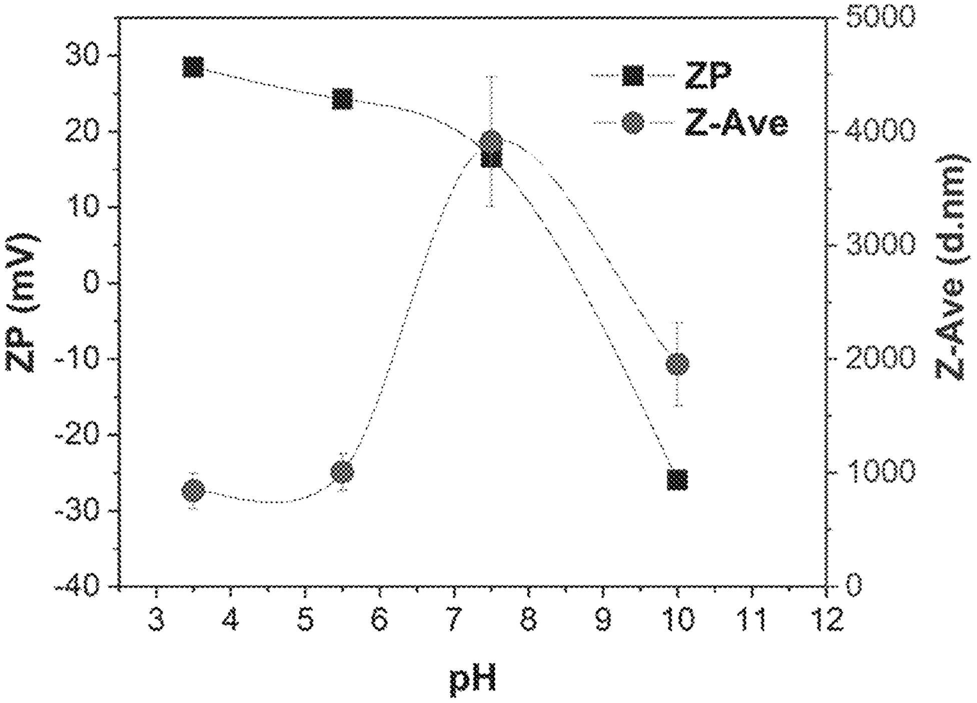
FIG. 4 is a graphical representation of changes in the zeta potential (ZP) and average hydrodynamic diameter (Z-Ave) of bare ferrihydrite particles at a ferrihydrite content of 50 mg/L.
Figure 5:
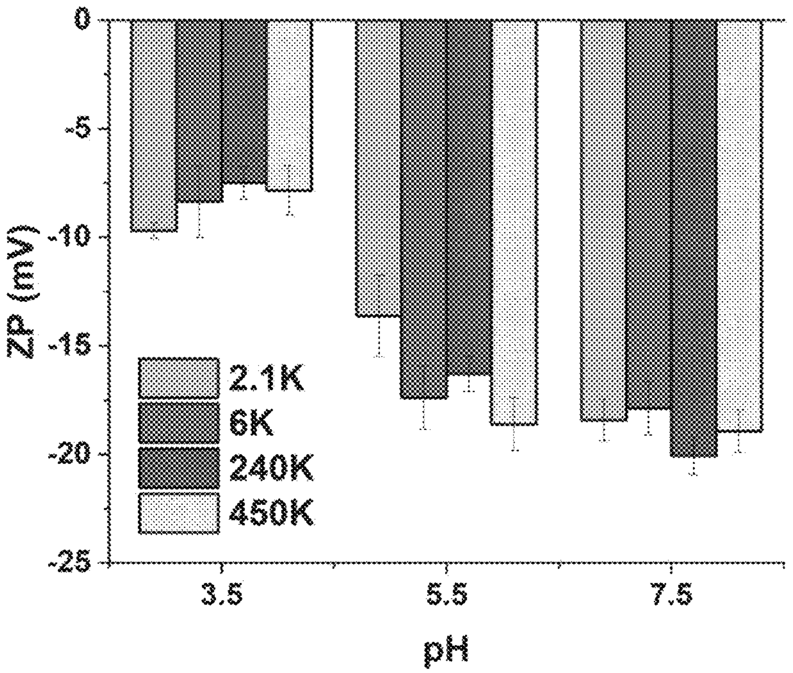
FIG. 5 is a graphical representation of changes in the zeta potential (ZP) of PAA-coated ferrihydrite at different pH values. Ferrihydrite was coated with PAA in the A6 growth medium at a ferrihydrite to PAA ratio of 1/10 (w/w). [ferrihydrite]=50 mg/L.

The results presented in FIG. 4 demonstrate that the pH of the suspension has a significant impact on the zeta potential of the bare (untreated) ferrihydrite particles. When the pH is above the point of zero zeta potential ($pH_{icp}$), which has been reported to be approximately pH 8 for bare ferrihydrite, the zeta potential becomes negative. The hydrodynamic particle diameter of bare ferrihydrite exhibits a rapid increase from pH 3.5 to 7.5, which can be attributed to the decrease in the absolute positive zeta potential. This decrease in zeta potential facilitates particle aggregation, leading to a reduction in colloidal stability. In contrast, when ferrihydrite is coated with PAA at a ferrihydrite to PAA ratio of 1/10, the surface charge of the PAA-coated ferrihydrite particles becomes negative, as shown in FIG. 5. The absolute value of this negative zeta potential increases as the pH increases from 3.5 to 7.5, suggesting that the dissociation of COOH groups of the PAA polymers results in negatively charged —$COO^-$ groups along the PAA chains. The adsorption of the polymer onto the ferrihydrite is responsible for the change in zeta potential of the polymer-coated ferrihydrite for several reasons: (1) the sorbed polymer chains have negatively charged functional groups; (2) there is a shift in the slipping plane due to the formation of the polymeric adsorbed layer; and (3) active sites on the particle surface are now blocked.

The degree of dissociation of the carboxylic groups of the PAA chains depends on the pH. For example, the degree of dissociation of these carboxylic groups on the surface of $ZrO_2$ was 0.03 at pH 3, and 0.97 at pH 6. When the pH is above the $pK_a$ (4.5), uncharged PAA chains with a globular structure tend to induce densely packed PAA adsorption on oxide surfaces. However, the PAA chains undergo a conformational change at higher pH values, forming prolate and swelled structures (e.g., open-coil conformations) due to ionic repulsions. As a result, the PAA chains adopt a more stretched conformation at higher pH values, leading to increased blocking of active sites on ferrihydrite and a shift in the slipping plane, ultimately reducing the zeta potential.

The results presented in FIG. 5 show that the negative zeta potential of all PAA-coated ferrihydrite samples decreased as the pH increased from 3.5 to 5.5. Notably, the 2.1K and 240K-coated ferrihydrite exhibited a further decrease in the negative zeta potential above pH 5.5. However, subsequent experiments were conducted at pH 5.5 because, as mentioned above, acidic conditions are required for the A6-mediated Feammox process.

Figure 6:
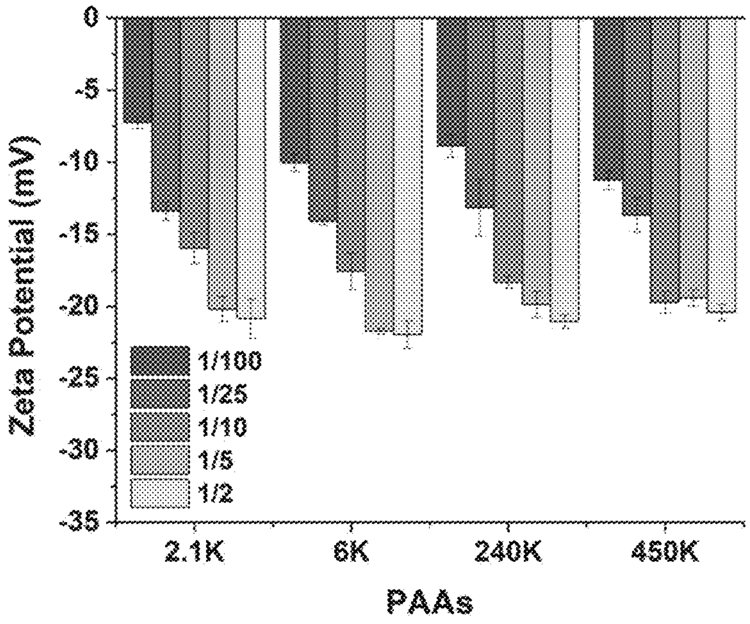
FIG. 6 is a graphical representation of the effect of the PAA-coated ferrihydrite (mass of PAA/mass of ferrihydrite) on zeta potentials as a function of PAA molecular weight and PAA loading in A6 growth medium at 50 mg/L of ferrihydrite (pH 5.5).

Based on the above results, a pH of 5.5 was selected to study the effect of different mass ratios of PAA to ferrihydrite on the zeta potential of PAA-coated ferrihydrite. The results depicted in FIG. 6 demonstrate that the absolute value of the negative zeta potential increases as the ratio of PAA mass to ferrihydrite mass increases from 1:100 to 1:5 for all PAAs, except for the 450K PAA. In the case of the 450K PAA, no significant changes in the negative zeta potential were observed once the ratio reached 1:10. The results further indicate that the effect of polymer molecular weight on the zeta potential is negligible. This can be attributed to the similarity in total length and the number of tails and loops formed at the oxide interface among all PAAs. Results also show that increasing the PAA loading on ferrihydrite leads to significant changes in the zeta potential. Colloidal stability is commonly classified based on the zeta potential values. Colloidal suspensions with zeta potentials of ±0-10 mV, ±10-20 mV, ±20-30 mV, and ±30 mV are considered highly unstable, relatively stable, moderately stable, and highly stable, respectively. Therefore, based on the studied PAA-coated particles, moderate colloidal stability is achieved at a PAA to ferrihydrite mass ratio of 1:5 in the A6 growth medium at pH 5.5.

Figure 7A:
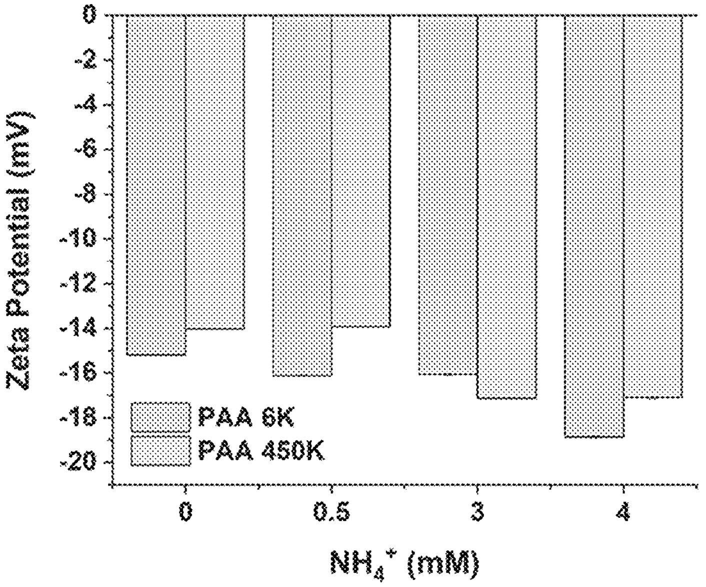
FIG. 7A is a graphical representation of zeta potentials of 6 K and 450 K-coated ferrihydrite vs. $NH^{4+}$ concentration.
Figure 7B:
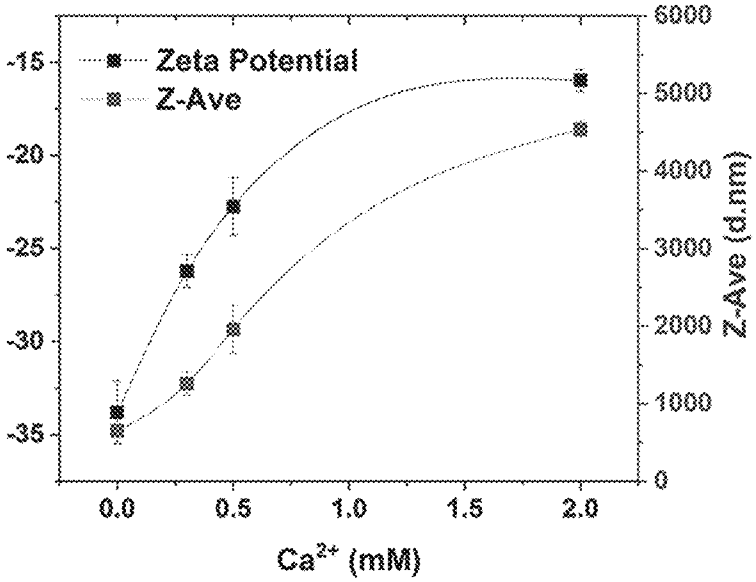
FIG. 7B is a graphical representation of zeta potential and average hydrodynamic diameter (Z-Ave) of 6 K-coated ferrihydrite vs. $Ca^{2+}$ concentration. All samples were tested in the A6 growth medium at pH 5.5.

FIG. 7 shows the impact of $NH_4^+$ (FIG. 7A) and $Ca^{2+}$ (FIG. 7B) concentrations in the A6 growth medium on the particle stability of PAA-coated ferrihydrite. $NH_4^+$ was selected because it is the electron donor for the growth of A6 and will have to be present at the millimolar level, whereas $Ca^{2+}$ is a common cation that can be present, also in the millimolar range, in many groundwaters. Results show that the presence of $NH_4^+$ has only a small effect on the zeta potential of the PAA-coated ferrihydrite, while the presence of $Ca^{2+}$ has a significant effect. As the $Ca^{2+}$ concentration increased from 0 mM to 2 mM, the zeta potential increased from −33.8 to −16.0 mV along with an 8-fold increase in the hydrodynamic particle diameter. Therefore, the presence of a divalent cation such as $Ca^{2+}$ may negatively affect the transport of the PAA-coated ferrihydrite in a porous medium, which has been shown previously. Specifically, previous column-transport studies revealed that the presence of 0.5 mM of $Ca^{2+}$ caused a significant delay in the breakthrough of PAA-coated ferrihydrite, while at $Ca^{2+}$ concentrations of 2 mM the transport of PAA-coated ferrihydrite was nearly completely hindered.

A6 requires acidic conditions for its growth, and higher $Ca^{2+}$ concentrations as examined above are typical for alkaline and not acidic groundwaters. Hence, for A6-based PFAS bioremediation schemes that may require the supply of Fe oxides, the lower $Ca^{2+}$ concentrations were a focus. Therefore, the $Ca^{2+}$ concentration in the A6 growth medium was adjusted to 0.1 mM, which resulted in highly stable colloids with negative zeta potentials lower than −30 mV in all PAA-coated particles (Table 1).

TABLE 1

Zeta potential and hydrodynamic diameter of PAA-coated ferrihydrite in the A6 growth medium (pH 5.5) after adjusting the $Ca^{2+}$ concentration to 0.1 mM.

| PAA | Zeta potential ± 1σ (mV) | Hydrodynamic diameter ± 1σ (μm) |
|---|---|---|
| 2.1K | −33 ± 2 | 843 ± 73 |
| 6K | −35 ± 1 | 923 ± 73 |
| 240K | −35 ± 2 | 1054 ± 120 |
| 450K | −37 ± 4 | 1081 ± 123 |

n = 3 for all samples.

Figure 8:
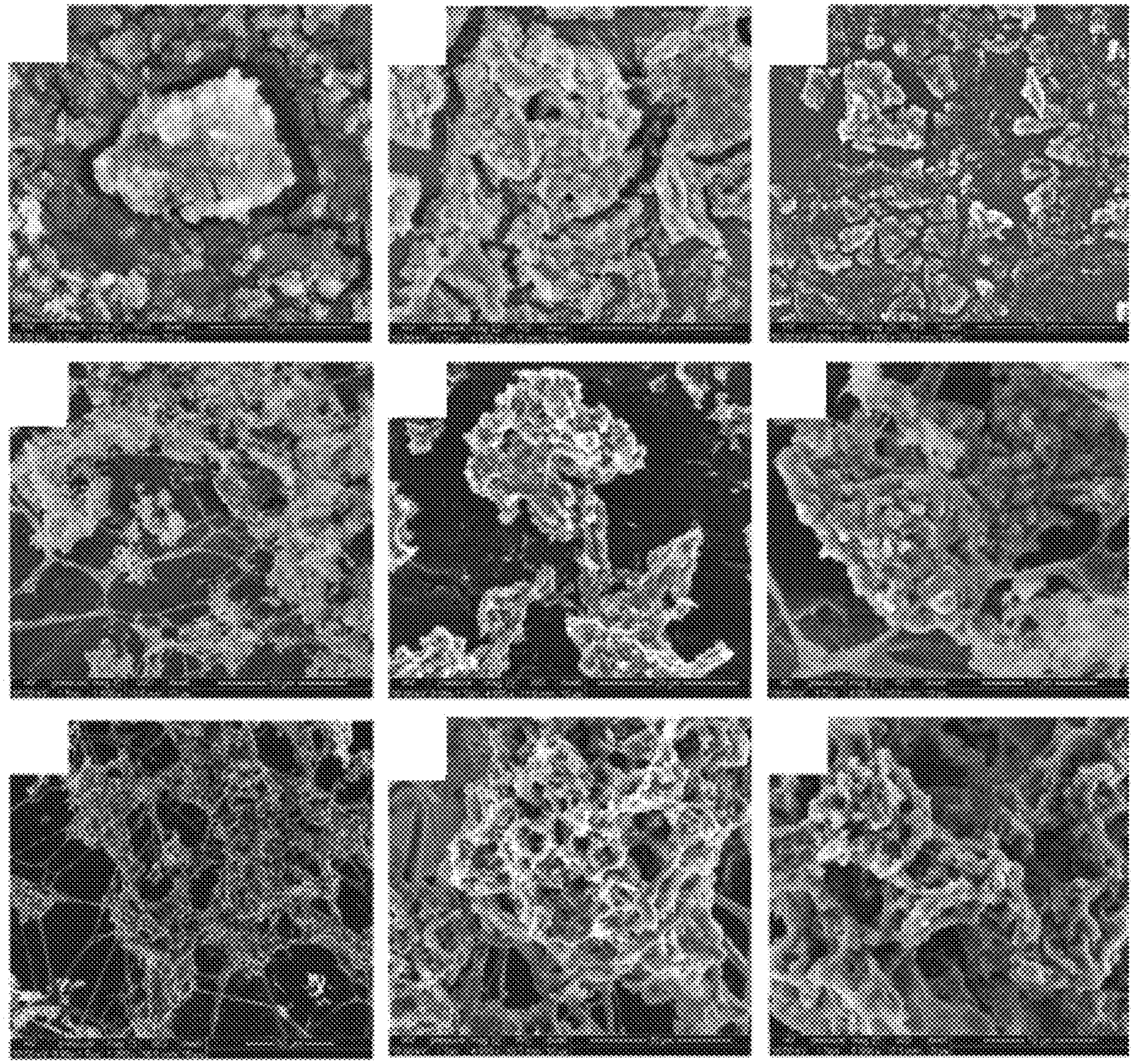
FIG. 8 is a series of environmental scanning electron microscopy (ESEM) images depicting bare ferrihydrite (top left), 2.1K-coated ferrihydrite (top center), 6K-coated ferrihydrite (top right), 240K-coated ferrihydrite (middle row), and 450K-coated ferrihydrite particles (bottom row) obtained at 1-torr of water vapor.

FIG. 8 shows the ESEM images of PAA-coated ferrihydrite prepared in the A6 growth medium (all images except top left), which followed the same coating procedure as described above, except that 250 mg/L of PAA was employed to coat the ferrihydrite at 1:5 ratio by weight for 24 hrs. FIG. 8 exhibits the morphology of bare ferrihydrite (top left), 2.1K (top center), 6K (top right), 240K (middle row), and 450K-coated ferrihydrite particles (bottom row). Images of the 240K and 450K-coated ferrihydrite are also shown at higher magnifications. In the absence of PAA in the solution (i.e., bare ferrihydrite), no apparent morphological differences were observed when compared to images of bare ferrihydrite reported previously. The micrographs of PAA-coated samples indicate the presence of PAA incorporated into ferrihydrite particles, forming flocs with surface porosity in the aggregates. Higher magnification images demonstrate that PAA-coated ferrihydrite flocs have different pore sizes of several micrometers. Moreover, the floc structure appears different depending on the molecular weight of the polymers. Pores in the flocs generated by the 450K coating are larger than those caused by other PAA coatings, presumably because the adsorption of large polymers on metal oxides blocks PAA macromolecules from entering the floc aggregates. Furthermore, the longer polymer tails and loops of the 450K PAA may induce a thicker adsorption layer on ferrihydrite compared to the smaller molecular weight PAAs.

Figure 9:
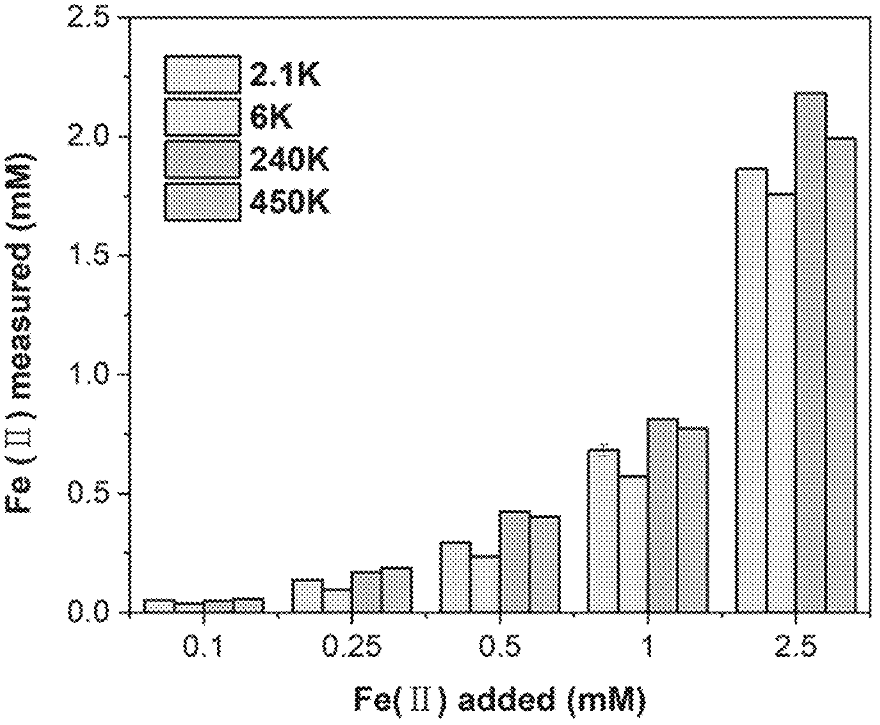
FIG. 9 is a graphical representation of free Fe(II) concentrations in the $FeCl_2$ solution in the presence of 250 mg/L of PAA.

Moreover, the carboxylic groups of the PAA chain have previously been reported to interact with multivalent cations (e.g., $Ca^{2+}$, $Mg^{2+}$, $Mn^{2+}$, $Zn^{2+}$, and $Fe^{3+}$) in the solution through electrostatic and hydrogen bonds, resulting in ionic cross-linking. Covalent bonding facilitates chemical cross-linking, and when combined with ionic cross-linking, it can form PAA hydrogels capable of retaining a large amount of water. Various compounds in the A6 growth medium may induce ionic cross-linking in all PAA-coated samples. However, based on the morphologies shown in FIG. 8, hydrogel formation appears only in the case of the 240K and 450K-coated ferrihydrite samples. As illustrated in FIG. 8, middle and bottom rows, 240K and 450K-coated ferrihydrite samples exhibit interconnected structures of polymer and ferrihydrite aggregates. In addition, PAA chains can form chelates such as Fe(II)-PAA/Fe(III)-PAA due to multiple binding sites. Therefore, dissociated PAA chains in the solution might not liberate free Fe(II) ions. As shown in FIG. 9, the final Fe(II) concentrations measured using the ferrozine method were significantly lower than the initial Fe(II) concentrations in the presence of PAAs, suggesting that the Fe(II)-PAA complex inhibits the formation of the Fe(II)-ferrozine complex.

Influence of Bare Ferrihydrite and PAA-Coated Ferrihydrite as the Electron Acceptor of A6

Figure 10:
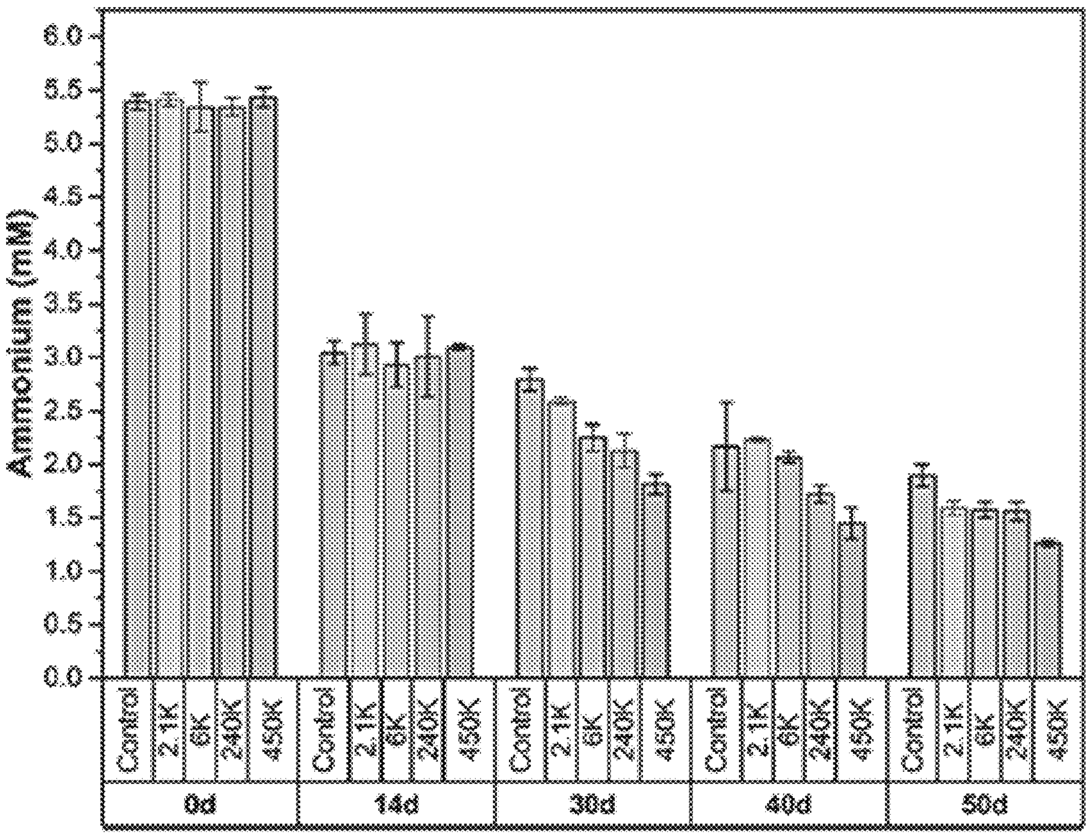
FIG. 10 is a graphical representation of ammonium oxidation in A6-enrichment-culture incubations amended with bare ferrihydrite (control) and PAA-coated ferrihydrite.

Changes in $NH_4^+$ concentrations were investigated during the incubation to assess whether A6 can oxidize $NH_4^+$ by using PAA-coated ferrihydrite as the electron acceptor (FIG. 10). By day 14, substantial decreases in the $NH_4^+$ concentration (~44%) were observed in all incubations. There were no significant differences ($p>0.05$) between the control (bare ferrihydrite) and the PAA-treated samples by day 14 of the incubations. However, the amount of $NH_4^+$ oxidized increased compared to the control after 14 days. At the end of the incubations, significantly more $NH_4^+$ was removed in all PAA-coated samples than in the control, which indicates not only that A6 can utilize the PAA-coated ferrihydrite as the electron acceptor, but that in these incubations the presence of the PAA resulted in enhanced A6 activity.

Without being beholden to any particular theory, one possible reason for the enhancement in A6 activity could be that the presence of the PAA leads to a lower increase in free Fe(II) concentration in the solution. As shown in Equation 1, this reduced free Fe(II) concentration may stimulate the oxidation of $NH_4^+$ and result in an enhanced Feammox process. In general, particularly for the samples collected on days 30 and 40, the amount of $NH_4^+$ removed showed an increasing trend with the molecular weight of the PAA. From day 30 to the end of the incubations on day 50, the highest $NH_4^+$ removal was observed in the presence of 450K-coated ferrihydrite, indicating that among the examined PAAs, the 450K-PAA-coated ferrihydrite enhanced the Feammox process the most. FIG. 9 shows that all PAAs appeared to form complexes with Fe(II), with the 6K PAA resulting in the largest decrease in free Fe(II) concentration. However, this did not correspond to the highest $NH_4^+$ oxidation. Therefore, these results suggest that other factors than the PAA-Fe(II) complex may play a role in electron transfer during the Feammox reaction.

The EIS measurements were conducted to determine if the PAA coating aids the electron transfer process to the ferrihydrite, enhancing the Feammox activity. The impedance data were fitted to an equivalent circuit model, revealing a charge transport resistance of $(4.8\pm0.34)\times10^{10}$ ohm for bare ferrihydrite. The charge transfer resistance values for the 6K-coated ferrihydrite and 450K-coated ferrihydrite increased PFOA degradation over 40 days compared to those with 2.1K and 240K-coated ferrihydrite, as well as the control with no PAA.

During the degradation of PFOA in the A6-enrichment-culture incubations, the production of various shorter-chain PFAAs (i.e., PFOA degradation intermediates) was observed. As shown in Table 2, the concentration of these intermediates was several orders of magnitude lower than that of the PFOA or the change in PFOA concentration.

TABLE 2

Fluorine balance of (A) control, (B) 2.1K, (C) 6K, (D) 240K, and (E) 450K-coated samples during 40 days of incubation. n = 3 for all samples. All error bars correspond to ± 1σ (std dev).

| | F in PFOA | F in PFHpA | F in PFHxA | F in PFPeA | F in PFBA | $F^-$ | Total F |
|---|---|---|---|---|---|---|---|
| Control | | | | | | | |
| 0 d | $(3.70 \pm 0.36) \times 10^{-2}$ | | $(1.47 \pm 1.39) \times 10^{-7}$ | | $(9.27 \pm 5.78) \times 10^{-5}$ | $(1.67 \pm 0.17) \times 10^{-2}$ | $(5.37 \pm 0.48) \times 10^{-2}$ |
| 30 d | $(2.52 \pm 0.52) \times 10^{-2}$ | | $(4.70 \pm 4.41) \times 10^{-7}$ | | $(4.06 \pm 5.66) \times 10^{-7}$ | $(2.72 \pm 0.04) \times 10^{-2}$ | $(5.23 \pm 0.51) \times 10^{-2}$ |
| 40 d | $(1.49 \pm 0.18) \times 10^{-2}$ | $(7.16 \pm 5.32) \times 10^{-8}$ | $(6.53\pm 5.06) \times 10^{-7}$ | | $(6.10 \pm 4.12) \times 10^{-7}$ | $(3.17 \pm 0.09) \times 10^{-2}$ | $(4.66 \pm 0.24) \times 10^{-2}$ |
| 0 d | $(3.70 \pm 0.36) \times 10^{-2}$ | | $(1.47 \pm 1.39) \times 10^{-7}$ | | $(9.27 \pm 5.78) \times 10^{-5}$ | $(1.67 \pm 0.17) \times 10^{-2}$ | $(5.37 \pm 0.48) \times 10^{-2}$ |
| 30 d | $(2.52 \pm 0.52) \times 10^{-2}$ | | $(4.70 \pm 4.41) \times 10^{-7}$ | | $(4.06 \pm 5.66) \times 10^{-7}$ | $(2.72 \pm 0.04) \times 10^{-2}$ | $(5.23 \pm 0.51) \times 10^{-2}$ |
| 40 d | $(1.49 \pm 0.18) \times 10^{-2}$ | $(7.16 \pm 5.32) \times 10^{-8}$ | $(6.53 \pm 5.06) \times 10^{-7}$ | | $(6.10 \pm 4.12) \times 10^{-7}$ | $(3.17 \pm 0.09) \times 10^{-2}$ | $(4.66 \pm 0.24) \times 10^{-2}$ |
| 0 d | $(3.70 \pm 0.36) \times 10^{-2}$ | | $(1.47 \pm 1.39) \times 10^{-7}$ | | $(9.27 \pm 5.78) \times 10^{-9}$ | $(1.67 \pm 0.17) \times 10^{-2}$ | $(5.37 \pm 0.48) \times 10^{-2}$ |
| 30 d | $(2.52 \pm 0.52) \times 10^{-2}$ | | $(4.70 \pm 4.41) \times 10^{-7}$ | | $(4.06 \pm 5.66) \times 10^{-7}$ | $(2.72 \pm 0.04) \times 10^{-2}$ | $(5.23 \pm 0.51) \times 10^{-2}$ |
| 40 d | $(1.49 \pm 0.18) \times 10^{-2}$ | $(7.16 \pm 5.32) \times 10^{-8}$ | $(6.53 \pm 5.06) \times 10^{-7}$ | | $(6.10 \pm 4.12) \times 10^{-7}$ | $(3.17 \pm 0.09) \times 10^{-2}$ | $(4.66 \pm 0.24) \times 10^{-2}$ |
| 240K | | | | | | | |
| 0 d | $(4.08 \pm 0.48) \times 10^{-2}$ | | | | $(4.15 \pm 5.61) \times 10^{-8}$ | $(1.57 \pm 0.06) \times 10^{-2}$ | $(5.65 \pm 0.53) \times 10^{-2}$ |
| 30 d | $(2.79 \pm 0.38) \times 10^{-2}$ | | | $1.91 \times 10^{-8}$ | $(3.86 \pm 4.00) \times 10^{-7}$ | $(3.54 \pm 0.12) \times 10^{-2}$ | $(6.33 \pm 0.42) \times 10^{-2}$ |
| 40 d | $(1.94 \pm 0.41) \times 10^{-2}$ | $(8.60 \pm 2.74) \times 10^{-8}$ | $(1.08 \pm 0.79) \times 10^{-6}$ | | $(1.33 \pm 1.77) \times 10^{-6}$ | $(4.39 \pm 0.11) \times 10^{-2}$ | $(6.33 \pm 0.42) \times 10^{-2}$ |
| 0 d | $(4.08 \pm 0.48) \times 10^{-2}$ | | | | $(4.15 \pm 5.61) \times 10^{-8}$ | $(1.57 \pm 0.06) \times 10^{-2}$ | $(5.65 \pm 0.53) \times 10^{-2}$ |
| 30 d | $(2.79 \pm 0.38) \times 10^{-2}$ | | | $1.91 \times 10^{-8}$ | $(3.86 \pm 2\ 00) \times 10^{-7}$ | $(3.54 \pm 0.12) \times 10^{-2}$ | $(6.33 \pm 0.42) \times 10^{-2}$ |
| 40 d | $(1.94 \pm 0.41) \times 10^{-2}$ | $(8.60 \pm 2.74) \times 10^{-8}$ | $(1.08 \pm 0.79) \times 10^{-6}$ | | $(1.33 \pm 1.77) \times 10^{-6}$ | $(4.39 \pm 0.11) \times 10^{-2}$ | $(6.33 \pm 0.42 \times 10^{-2}$ |

were significantly reduced, with values of $(2.0\pm0.31)\times10^{10}$ and $(1.7\pm0.71)\times10^{10}$ ohm, respectively. Although the charge transfer resistance between the 6K-coated ferrihydrite and 450K-coated ferrihydrite showed negligible differences, a significant decrease in charge transfer resistance was observed between the PAA-coated samples and bare ferrihydrite. This result is consistent with the improved Feammox reaction by A6 in the presence of PAA-coated ferrihydrite.

Figure 11:
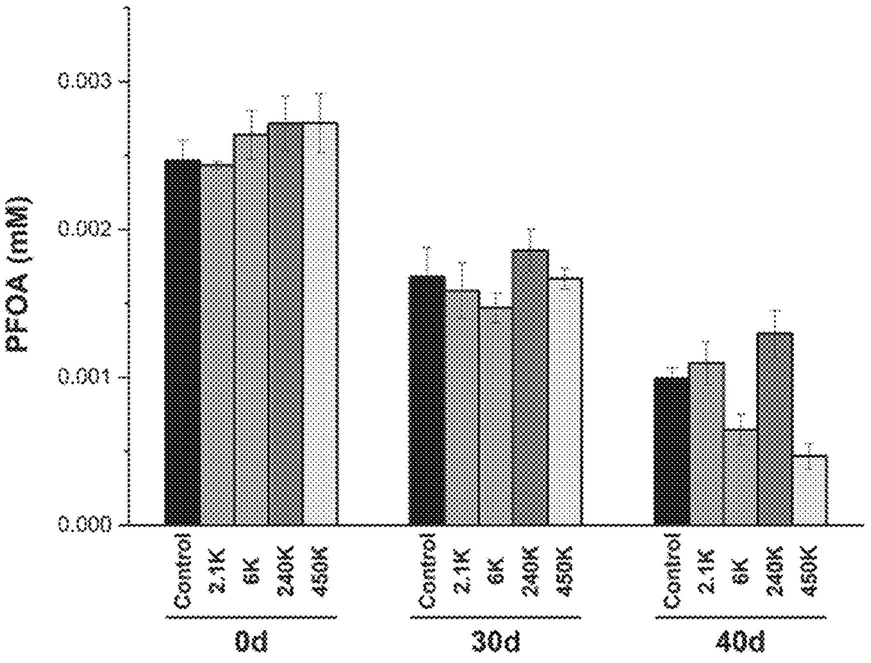
FIG. 11 is a graphical representation of degradation of 1 mg/L of PFOA in A6-enrichment-culture incubations amended with bare ferrihydrite (control) and PAA-coated ferrihydrite.

After adding 1 mg/L (0.0024 mM) of PFOA to the A6 enrichment-culture incubations, changes in the PFOA concentration were investigated over a 40-day incubation period in both the control incubations (bare ferrihydrite) and the incubations with PAA-coated ferrihydrite. The decreasing PFOA concentration over time in the incubations, as shown in FIG. 11, indicates that the presence of the PAA-coated ferrihydrite had a positive effect on PFOA degradation for the 6K and 450K treatments, especially for incubation times longer than 30 days. Specifically, incubations with the 6K and 450K-coated ferrihydrite exhibited significantly In the incubations conducted herein, as well as in previous incubations with A6 and PFOA, intermediate PFAAs with chain lengths of 7, 6, 5, and 4 carbons were detected, but always sporadically. It is worth noting that even in replicate incubations, the specific PFAA at one time point in one replicate did not guarantee its detection in the next replicate. Hence, the differences in the appearance of shorter carbon chain PFAAs in these incubations should not be attributed to a specific PAA-coating. Instead, it is understood that the accumulation of these intermediates was generally minor in all PAA treatments, providing additional evidence for the degradation of PFOA. Moreover, the production of these intermediates and $F^-$ at the concentrations measured indicates that the degradation of PFOA results in a relatively complete defluorination, as evidenced by the fluorine balance below.

Figure 12:
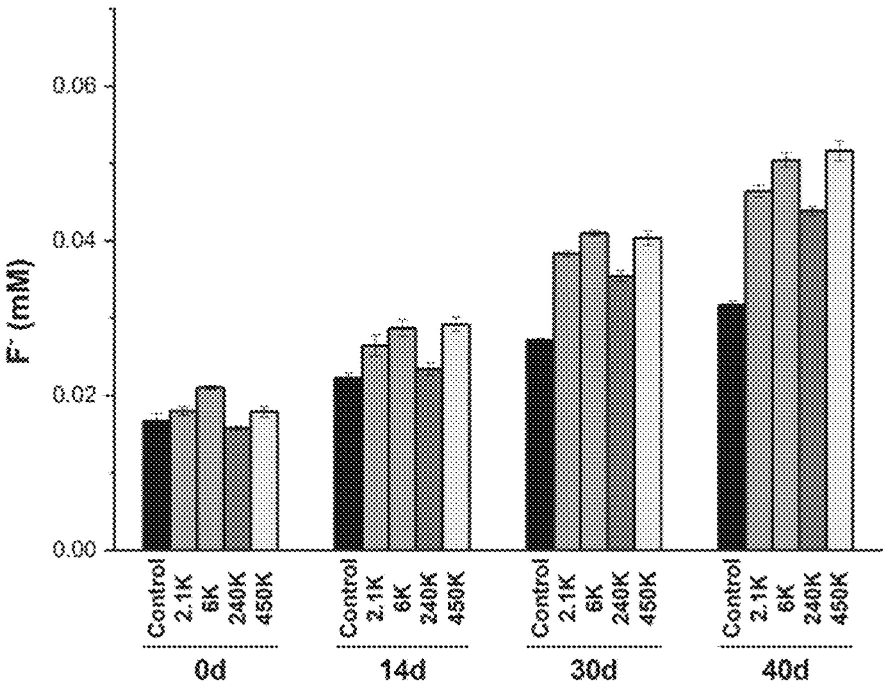
FIG. 12 is a graphical representation of fluoride production in A6 enrichment-culture incubations amended with either ferrihydrite or PAA-coated ferrihydrite. Note that the fluoride (0.018 mM) at the beginning of the incubation is due to transfer from the A6 enrichment-culture inoculation with active PFAS defluorination.

The concentrations of $F^-$ in solution vs. time in these incubations are presented in FIG. 12, showing a gradual increase in the $F^-$ concentrations as the incubations proceed. For incubation times of 30 and 40 days, significantly more $F^-$ is seen in the presence of any of the incubations with PAA-coated ferrihydrite than in the control. Consistent with the decrease in PFOA concentrations, the largest increases in concentrations of $F^-$ were detected in the incubations with the 6K and 450K-coated ferrihydrite.

The difference in the measured concentrations of $F^-$ in solution between the control incubations and those with PAA-coated ferrihydrite is larger than one would have anticipated based on the differences in PFOA degradation. One possible explanation for this discrepancy is that there was more $F^-$ sorption onto the bare ferrihydrite compared to the PAA-coated ferrihydrite. For example, the fluorine balance, which is further elaborated in Table 2, reveals that the incubations with the PAA-coated ferrihydrite exhibited a close fluorine balance, with similar total fluorine concentrations at the beginning and end of the incubations. In contrast, the control incubation displayed approximately 14% less fluorine at the end of the incubation period than the initial concentration. This discrepancy suggests that some $F^-$ might have become associated with the solid phase in the incubations with bare ferrihydrite. In previous studies of PFOA degradation by A6 enrichment cultures, significant adsorption of $F^-$ adsorption (ranging from 4.8% to 47%) onto sludge samples at pH 5 was observed, and this adsorption increased with higher pH values. Therefore, without being beholden to any particular theory, it is plausible that the negatively charged PAA-coated ferrihydrite prevents $F^-$ ions from adsorbing onto the ferrihydrite surface, which could explain the improved fluorine balance observed in the incubations with the PAA-coated ferrihydrite compared to the control without PAA.

Based on the concentrations of PFOA, the shorter PFAAs produced during the incubations, and the $F^-$ concentration, a fluorine mass balance was performed and is presented in Table 2. The results indicate that a relatively good fluorine balance was maintained through the incubation period. Most of the fluorine in the system was found either as organic fluorine in the form of PFOA or as $F^-$, with a relatively small fraction of the overall fluorine present in the intermediates. As mentioned above, some $F^-$ might have sorbed onto the ferrihydrite, as evidenced by the results in Table 2. In the presence of the PAAs, the fluorine balance was close, while in the incubations with the bare ferrihydrite, approximately 14% of the F was not accounted for on day 40.

These results indicate that no significant degradation intermediates were missed in the analyses and that since the F balance was conducted on the aqueous supernatant, there was little if any loss of fluorinated compounds or $F^-$ in the presence of PAA due to sorption, and that the observed decrease in PFOA concentration was due to degradation.

Figure 13:
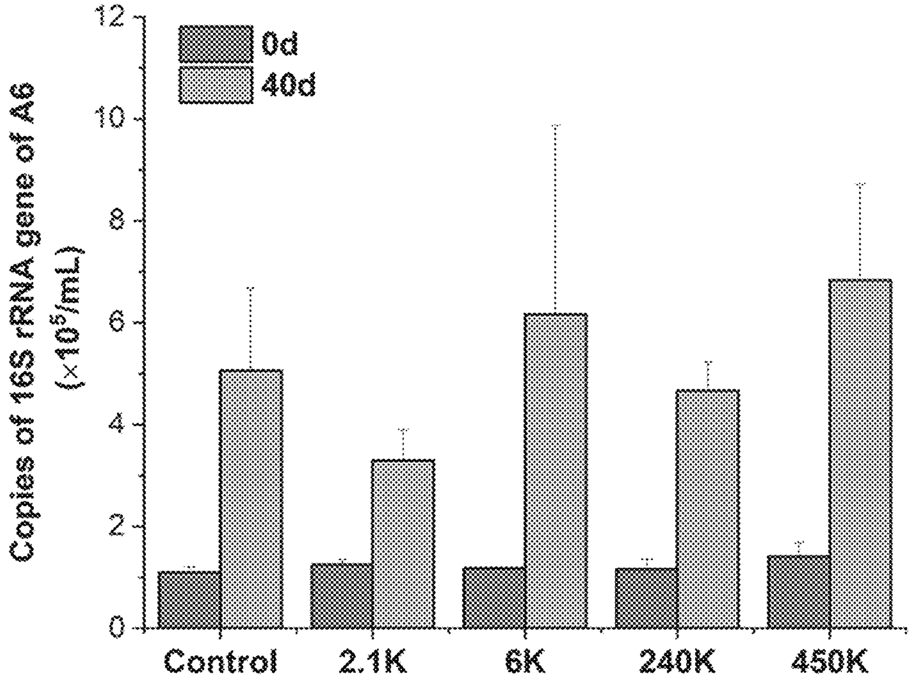
FIG. 13 is a graphical representation of 16S rRNA gene copy numbers of A6 in control (no PAA) and PAA-coated samples on day 0 and 40 of the incubations.

The qPCR results presented in FIG. 13 show that the 16S rRNA gene numbers of A6 appear to have increased during the 40-day incubations. However, it should be noted that this increase is not statistically significant due to the relatively large uncertainties (standard deviations) associated with the qPCR analyses. Nevertheless, the PAA-coated ferrihydrite did not hinder the growth of A6 over the 40-day incubation period.

Results of the 16S rRNA sequencing (Table 3) show a noticeable increase in the total bacterial population in the PAA-coated samples compared to the control over the 40-day incubation, indicating that the presence of the PAA may be beneficial for the growth of heterotrophs. Over this period, A6 remained the most abundant bacterium among these microbial communities, revealing that increases in heterotrophs did not negatively affect the A6 growth. Moreover, the most abundant phylum consisted of Actinobacteria and Firmicutes in all samples before and after the incubation, suggesting that the main microbial structure did not shift much in the presence of PAA over the duration of these experiments. The abundance of the phylum Proteobacteria was prominent in all samples except for the 450K-coated sample, suggesting that the 450K coating may have distinct effects on the microbial community compared to the smaller PAAs. While the results presented in Table 3 do not have replicates, they also indicate that A6 numbers were higher at the end of the incubations when the PAA-coated ferrihydrite was present compared to the bare ferrihydrite control. This observation aligns with the increased $NH_4^+$ oxidation observed in the presence of the PAA-coated ferrihydrite, suggesting a correlation between A6 abundance and the enhanced Feammox process facilitated by the PAA-coated ferrihydrite.

TABLE 3

Comparison in the total OTUs and relative frequency of A6 among the incubation samples.

| Sample | Incubation days | Total OTU | A6 OTU |
|---|---|---|---|
| Original | 0 day | 2413 | 1063 |
| Control | | 4353 | 2472 |
| 2.1K | | 7200 | 3176 |
| 6K | 40 days | 7079 | 3083 |
| 240K | | 6269 | 2275 |
| 450K | | 8733 | 4249 |

Example 3

This present disclosure characterized the impact of coating ferrihydrite with PAAs of different molecular weights and varying PAA:ferrihydrite loadings on particle stability. Additionally, the bioavailability of PAA-coated ferrihydrite for the Feammox process and the degradation of PFOA in A6-enrichment-culture incubations were assessed. At pH 5.5, which was chosen to ensure optimal conditions for both the stability of the PAA-coated particles and the growth of A6, highly stable ferrihydrite particles at zeta potentials of more than −30 mV were observed in all PAA-coated ferrihydrite samples when the solid ratio of PAA to ferrihydrite was 1:5. A6 enrichment-culture incubations, conducted over 40 days, using either bare ferrihydrite or PAA-coated ferrihydrite revealed that coating ferrihydrite with PAAs enhanced $NH_4^+$ oxidation, PFOA removal, and $F^-$ production compared to the incubation with bare ferrihydrite. The incubations with the 6K and 450K PAA-coated ferrihydrite resulted in statistically significant increases in PFOA degradation over the 40-day incubations, compared to the incubation with bare ferrihydrite. 16S rRNA sequencing and qPCR data demonstrate that the PAA treatment does not adversely affect the growth of A6 and may even enhance the final numbers of A6. PAAs-treated samples also resulted in a higher total bacterial population in the incubations than the non-PAA-treated sample, indicating that PAAs may stimulate the growth of heterotrophic bacteria. Although a noticeable shift in the microbial community structure was observed in the 450K-treated sample compared to the other PAA treatments, the dominant bacterial group was A6 across all samples.

The present disclosure demonstrates that the PAA-coated ferrihydrite particles can serve as electron acceptor for the Feammox reaction and PFOA degradation by A6. Several factors, such as the formation of PAA-Fe(II) complexes in the solution and reduced charge transfer resistance for PAA-coated ferrihydrite, may contribute to the enhanced performance of A6 in the presence of the PAA-coated ferrihydrite.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

SEQUENCE LISTING

The patent contains a lengthy sequence listing. A copy of the sequence listing is available in electronic form from the USPTO web site (https://seqdata.uspto.gov/docdetail?docId=US12807523B2). An electronic copy of the sequence listing will also be available from the USPTO upon request and payment of the fee set forth in 37 CFR 1.19(b)(3).

The invention claimed is:

1. A medium comprising:

an electron donor;

an electron acceptor comprising iron particles having a polymeric coating; and a Feammox bacterium and/or one or more enzymes capable of oxidizing the electron donor coupled with reduction of Fe(III) of the iron particles to Fe(II).

2. The medium of claim 1, wherein the electron donor comprises ammonium or an ammonium containing compound.

3. The medium of claim 1, wherein the electron donor comprises molecular hydrogen.

4. The medium of claim 1, wherein the electron donor comprises a mixture of $H_2$ and ammonium.

5. The medium of claim 1, wherein the polymer of the polymeric coating comprises one or more negatively charged moieties.

6. The medium of claim 5, wherein the one or more negatively charged moieties are pendant to the polymer backbone.

7. The medium of claim 5, wherein the one or more negatively charged moieties are selected from the group consisting of carboxylate, sulfonate, and phosphonate.

8. The medium of claim 5, wherein the one or more negatively charged moieties have a pKa of 4 to 6.

9. The medium of claim 1, wherein polymer of the polymeric coating comprises polyacrylate.

10. The medium of claim 1, wherein polymer of the polymeric coating comprises polysulfonic acid or polyphosphonic acid.

11. The medium of claim 1, wherein polymer of the polymeric coating has a weight average molecular weight of 2,000 Da to 500,000 Da.

12. The medium of claim 11 having a pH of 4 to 7.

13. The medium of claim 1, wherein the polymeric coating exhibits porosity.

14. The medium of claim 1, wherein the iron particles comprise ferrihydrite, iron oxide, elemental iron, a goethite, a nontronite, an iron-rich clay, or mixtures thereof.

15. The medium of claim 1, wherein the medium is aqueous-based.

16. The medium of claim 1 further comprising an oxidant operable to oxidize the Fe(II) to Fe(III).

17. The medium of claim 1 further comprising a fluorochemical component, and the Feammox bacterium and/or one or more enzymes exhibit reductive dehalogenase activity capable of fluorochemical degradation in conjunction with oxidation of the electron donor and electron transfer to the electron acceptor.

18. The medium of claim 17, wherein the fluorochemical component comprises one or more fluorochemicals.

19. The medium of claim 18, wherein the fluorochemical component comprises fluoroalkyl compounds of perfluoroalkyl compounds.

20. The medium of claim 17, wherein the medium is soil, sludge, sorbent or solid contaminated with the fluorochemical component.

21. The medium of claim 1, wherein the Feammox bacterium is an Acidimicrobiaceae bacterium.

22. A system comprising:

a reactor, the reactor including one or more containers comprising a medium including an electron donor, an electron acceptor comprising iron particles having a polymeric coating, and a Feammox bacterium and/or one or more enzymes capable of oxidizing the electron donor coupled with reduction of Fe(III) of the iron particles to Fe(II).

23. The system of claim 22, wherein the medium further comprises a fluorochemical component, and the Feammox bacterium and/or one or more enzymes exhibit reductive dehalogenase activity capable of fluorochemical degradation in conjunction with oxidation of the electron donor and electron transfer to the electron acceptor.

24. A method of environmental remediation comprising:

providing a medium including an electron donor and a fluorochemical component;

disposing a Feammox bacterium and/or one or more enzymes exhibiting reductive dehalogenase activity in the medium;

degrading the fluorochemical component with the Feammox bacterium and/or enzymes in conjunction with oxidation of the electron donor and electron transfer to an electron acceptor comprising iron particles, wherein electron transfer to the iron particles is enhanced by providing the iron particles a polymeric coating.

25. The method of claim 24, wherein the electron donor comprises ammonium or an ammonium containing compound.

26. The method of claim 24, wherein the electron donor comprises molecular hydrogen.

27. The method of claim 24, wherein the polymer of the polymeric coating comprises one or more negatively charged moieties.

28. The method of claim 27, wherein the one or more negatively charged moieties are selected from the group consisting of carboxylate, sulfonate, and phosphonate.

29. The method of claim 24, wherein the medium has a pH of 4 to 7.

30. A method of ammonium oxidation comprising:

providing a medium including an electron donor comprising ammonium or an ammonium containing compound, an electron acceptor comprising iron particles, and a Feammox bacterium and/or one or more enzymes;

oxidizing the ammonium or ammonium containing compound with the Feammox bacterium and/or one or more enzymes coupled with reduction of Fe(III) of the iron particles to Fe(II), wherein electron transfer to the Fe(III) is enhanced by providing the iron particles a polymeric coating.

* * * * *